US 6,720,976 B1

(12) United States Patent
Shimizu et al.

(10) Patent No.: US 6,720,976 B1
(45) Date of Patent: Apr. 13, 2004

(54) IMAGE PROCESSING UNIT AND METHOD INCLUDING BLENDING PROCESSING

(76) Inventors: Yusuke Shimizu, c/o Sega Enterprises, Ltd., 2-12, Haneda 1-chome, Ohta-ku, Tokyo 144-8531 (JP); Hiroshi Yagi, c/o Sega Enterprises, Ltd., 2-12, Haneda 1-chome, Ohta-du, Tokyo, 144-8531 (JP)

( * ) Notice: Subject to any disclaimer, the term of this patent is extended or adjusted under 35 U.S.C. 154(b) by 0 days.

(21) Appl. No.: 09/388,435

(22) Filed: Sep. 2, 1999

(30) Foreign Application Priority Data

Sep. 10, 1998 (JP) .......................................... 10-256325
Aug. 9, 1999 (JP) .......................................... 11-225426

(51) Int. Cl.$^7$ ............................................. G06T 11/40
(52) U.S. Cl. ...................................... 345/629; 345/634
(58) Field of Search .......................... 345/435, 629–632

(56) References Cited

U.S. PATENT DOCUMENTS 5,625,764 A     4/1997   Tsujimoto et al.
5,831,628 A  * 11/1998   Shimizu ..................... 345/435
6,310,620 B1 * 10/2001   Lauer .......................... 345/424

FOREIGN PATENT DOCUMENTS

GB    2 226 937    7/1990
GB    2 328 569    2/1999
GB    2 331 217    5/1999
WO    WO 97/41536  11/1997

OTHER PUBLICATIONS

Wade; "PowerVR Second Generation: A Primer"; May 19, 1998; http://www.netmegs.com/~pvrnet/hardware/pvrsg_primer/pvrsg.html.
Beets; "PVRSG Tile Based Rendering"; Jun. 5, 1998; http://www.ping.be/powervr/PVRSGRendMain.html.

* cited by examiner

Primary Examiner—Matthew Luu
Assistant Examiner—Motilewa Good-Johnson

(57) ABSTRACT

The present invention allows executing blending processing for translucent polygons sequentially from the polygon at the front. The present invention is characterized in that rendering processing for translucent polygons is executed sequentially from the polygon at the front in the display screen. Therefore when color data $T_n$ and opacity $\alpha_n$ are provided to the nth polygon of the polygons sequentially arranged from the front in the display screen, components for the opacity $\alpha_n$ of the nth polygon out of the color data $T_n$ of the nth polygon is added to the image data $D_{n-1}$ up to the (n−1)th polygon according to the accumulated transparency value $X_{n-1}$ of the (n−1) number of polygons positioned at the front for rendering processing. This rendering processing is executed for all polygons, and the final image data $D_n$ is used as image data for display. In accordance with the above image processing, translucent polygons can be sequentially processed from the front, so rendering processing of important polygons positioned at the front in a display screen is not omitted, even if the time between frames is short. Therefore images with smooth movement can be reproduced without stopping movement of important characters comprised of polygons. The above image processing can be applied to general blending processing as well.

18 Claims, 10 Drawing Sheets

General Renderer $X_n = X_{n-1} * SR_n$ $D_n = D_{n-1} + T_n * DE_n * X_{n-1}$

Overlap of Translucent Polygons

FIG. 2A

Present Invention

|  | n | Xn | Dn |
|---|---|---|---|
| Initial Value | 0 | 1 | 0 |
|  | 1 | $X_1 = X_0(1-\alpha_1)$ | $D_1 = D_0 + T_1 \alpha_1 X_0$ |
|  | 2 | $X_2 = X_1(1-\alpha_2)$ | $D_2 = D_1 + T_2 \alpha_2 X_1$ |
|  | 3 | $X_3 = X_2(1-\alpha_3)$ | $D_3 = D_2 + T_3 \alpha_3 X_2$ |
| Result | 4 | $X_4 = X_3(1-\alpha_4)$ | $D_4 = D_3 + T_4 \alpha_4 X_3$ |

FIG. 2B

Prior Art

|  | n | Cn |
|---|---|---|
| Initial Value | – | $C_5$ |
|  | 4 | $C_4 = \alpha_4 T_4 + (1-\alpha_4)C_5$ |
|  | 3 | $C_3 = \alpha_3 T_3 + (1-\alpha_3)C_4$ |
|  | 2 | $C_2 = \alpha_2 T_2 + (1-\alpha_2)C_3$ |
| Result | 1 | $C_1 = \alpha_1 T_1 + (1-\alpha_1)C_2$ |

FIG. 3A  Present Invention

Polygon Data

| | α (Ratio) | R(Red) | G(Green) | B(Blue) | |
|---|---|---|---|---|---|
| Order from Front | 0.500 | 1.000 | 0.000 | 0.000 | T1:Red |
| | 0.500 | 0.000 | 0.000 | 1.000 | T2:Blue |
| | 0.500 | 1.000 | 1.000 | 0.000 | T3:Yellow |
| Background | 1.000 | 0.000 | 0.000 | 0.000 | T4:Black |

Rendering Result

| | n | Xn | Dn(R) | Dn(G) | Dn(B) |
|---|---|---|---|---|---|
| Initial Value | 0 | 1.000 | 0.000 | 0.000 | 0.000 |
| | 1 | 0.500 | 0.500 | 0.000 | 0.000 |
| | 2 | 0.250 | 0.500 | 0.000 | 0.250 |
| | 3 | 0.125 | 0.625 | 0.125 | 0.250 |
| Result | 4 | 0.000 | 0.625 | 0.125 | 0.250 |

FIG. 3B  Prior Art

Polygon Data

| | α (Ratio) | R(Red) | G(Green) | B(Blue) | |
|---|---|---|---|---|---|
| Background | 1.000 | 0.000 | 0.000 | 0.000 | T4:Black |
| Order from Back | 0.500 | 1.000 | 1.000 | 0.000 | T3:Yellow |
| | 0.500 | 0.000 | 0.000 | 1.000 | T2:Blue |
| | 0.500 | 1.000 | 0.000 | 0.000 | T1:Red |

Rendering Resutlt

| | n | Cn(R) | Cn(G) | Cn(B) |
|---|---|---|---|---|
| Initial Value | * | 0.000 | 0.000 | 0.000 |
| | 4 | 0.000 | 0.000 | 0.000 |
| | 3 | 0.500 | 0.500 | 0.000 |
| | 2 | 0.250 | 0.250 | 0.500 |
| Result | 1 | 0.625 | 0.125 | 0.250 |

Configuration of Game Machine

Flow Chart of Imagee Processing

Blending Processing for Translucent Polygon $$FB_m = PIX_m * \alpha_m + FB_{m-1} * (1-\alpha_m)$$
$$(DE_m) \qquad\qquad (SR_m)$$

Auxillary Filtering Processing $$FB_m = PIX_m * \alpha_m + FB_{m-1} * 1$$
$$\qquad\qquad\quad\| \qquad\qquad\quad \|$$
$$\qquad\qquad (DE_m) \qquad\quad (SR_m)$$

Color Filtering Processing $$FB_m = PIX_m * 0 + FB_{m-1} * PIX_m$$
$$\phantom{FB_m = }\underbrace{\phantom{PIX_m * 0}}_{(DE_m)} \phantom{+} \underbrace{\phantom{FB_{m-1} * PIX_m}}_{(SR_m)}$$

General Renderer

IMAGE PROCESSING UNIT AND METHOD INCLUDING BLENDING PROCESSING

BACKGROUND OF THE INVENTION

1. Field of the Invention

The present invention relates to an image processing unit and method for a plurality of polygons including translucent (semi-transparent) polygons, and more particularly to an image processing unit and method which can convert polygon data to image data sequentially from the polygon at the front in a display screen, even for translucent polygons. The present invention also relates to an image processing unit and method which can perform blending processing for a plurality of polygons sequentially from the polygon at the front in the display screen.

2. Description of the Related Art

In game machines and simulation machines, the positions of a plurality of polygons constituting a character or other objects are determined according to the operation input, image data is generated by executing rendering processing for polygons to be displayed among these polygons, and the image data is displayed.

Unlike for opaque polygons, the rendering processing for translucent polygons involves blending processing with another polygon positioned behind (back side), and conventionally rendering processing, including blending processing, must be performed sequentially from the translucent polygon at the back in the display screen.

In rendering processing for opaque polygons, on the other hand, overlapping portions are processed without any restrictions in the rendering sequence of a plurality of polygons by performing hidden-surface removal processing using Z-values, which indicate depth in the display screen. When opaque polygons and translucent polygons coexist, a general method is to process the opaque polygons in any sequence by the above hidden-surface removal processing using Z-values, then to process the translucent polygons sequentially from the back.

When the number of polygons to be processed increase in rendering processing, however, rendering processing may not complete within the predetermined time between frames. If greater importance is placed on the quality of image processing in such a case, the image processor must wait until rendering for all translucent polygons ends, which stops the movement of characters being displayed, and is inappropriate for a game machine or simulation machine. If greater importance is placed on the movement of characters, some polygons remain unprocessed within the time between frames. In such a case, rendering processing of translucent polygons is executed sequentially from the back, therefore processing of polygons at the front, which are the most important characters in the image, is ignored.

In addition, rendering processing for opaque polygons and translucent polygons must be processed separately if the respective efficiency of processing is considered, as mentioned above, which increases burden on image processing. Such an increased burden also makes it difficult to complete image processing within the time between frames.

It is proposed that not only in blending processing, using the opacity (or transparency) of translucent polygons, but also in general blending processing, color data is determined sequentially from the polygon at the back in the display screen, and blending processing is executed for the color data and the color data of the polygon to be processed next by using a predetermined source mixing coefficient and a destination mixing coefficient. In this case as well, processing sequentially from the polygon at the back in the display screen is demanded, where the same problems remain as in the case of processing for translucent polygons.

SUMMARY OF THE INVENTION

It is accordingly an object of the present invention to provide an image processing unit and method which can execute rendering processing of polygons at the front within the time between frames without fail in image processing for translucent polygons, and a recording medium where a program for a computer to execute the image processing is recorded.

It is another object of the present invention to provide an image processing unit and method which can execute rendering processing without differentiating between opaque polygons and translucent polygons so as to improve processing efficiency in the image processing for polygons where opaque polygons and translucent polygons coexist, and a recording medium where a program for a computer to execute the image processing is recorded.

It is still another object of the present invention to provide an image processing unit and method with high processing efficiency in general blending processing, and a recording medium where a program for a computer to execute the image processing is recorded.

To achieve the above objects, one aspect of the present invention is characterized in that the rendering processing of translucent polygons is executed sequentially from the polygon at the front in the display screen. For this, when the color data $T_n$ and the opacity $\alpha_n$ are provided to the nth polygon of the polygons sequentially arranged from the front in the display screen, work data $X_n$ is determined as $$X_n = (1-\alpha_n) \cdot X_n - 1,$$

then image data Dn is determined as $$D_n = D_n - 1 + T_n \cdot \alpha_n \cdot X_{n-1}$$

and the above arithmetic processing for determining the work data $X_n$ and the image data Dn is executed for all polygons, and the last image data Dn is used as the image data for display. In the above processing, the initial value $X_0$ of the work data $X_n$ is preferably 1, for example, and the initial value $D_o$ of the image data $D_n$ is preferably 0, for example.

According to the above image processing, translucent polygons can be sequentially processed from the front, so even if the time between frames is short, rendering processing for the polygons positioned at the front, which are more significant, in the display screen is not omitted. As a consequence, images with smooth movement can be reproduced without stopping movement of important characters comprised of the polygons.

The above mentioned work data $X_n$ indicates an accumulated value of the transparency $(1-\alpha)$ of the n number of translucent polygons. When a plurality of polygons overlap, rendering processing is executed sequentially from the polygon at the front, and in the rendering processing for respective polygons, the color data $T_n$ of the polygon at the back is added to the image data $D_{n-1}$ for the overlapped (n-1) number of polygons in front according to the value $X_{n-1}$, which is an accumulated transparency value of the (n-1) number of polygons in front.

Therefore, in the present invention, it is necessary to determine and record the accumulated transparency value of the overlapped polygons for each pixel while executing the above rendering processing sequentially from the polygon at the front.

In the rendering processing for each polygon, it is preferable to added the color data $T_n$ according to the opacity of the currently processing polygon. In other words, it is preferable to add the component of color data $T_n$ according to the opacity $\alpha_n$ of the currently processing polygon to the image data $D_{n-1}$ of the (n-1)number of overlapped polygons according to the accumulated value $X_{n-1}$ of the transparency $(1-\alpha)$ of the (n-1)th polygon, which is at the front of the currently processing polygon.

To achieve the above objects, another aspect of the present invention is an image processing unit which executes image processing for a plurality of polygons, including translucent polygons, to generate image data to be displayed, comprising: a rendering processing part where the color data $T_n$ and the opacity $\alpha_n$ or the transparency $(1-\alpha_n)$ are provided to the nth polygon of the polygons sequentially arranged from the front in the display screen, the color data $T_n$ and the opacity $\alpha_n$ or the transparency $(1-\alpha_n)$ of the above mentioned polygon are supplied to the polygons sequentially from the front, and the color data $T_n$ of the nth polygon is added to the image data $D_{n-1}$ up to the n-1th polygon according to the accumulated transparency value $X_{n-1}$ of the (n-1) number of polygons positioned at the front.

Preferably in the above invention, the above rendering processing part adds the components for the opacity $\alpha_n$ of the nth polygon out of the color data $T_n$ of the nth polygon to the image data $D_{n-1}$ up to the (n-1)th polygon according to the accumulated transparency value $X_{n-1}$ of the (n-1) number of polygons positioned at the front.

According to the above invention, a plurality of translucent polygons can be rendered sequentially from the front. Therefore the quality of image data is not diminished even if the processing of all polygons do not end within the time between frames.

Also in the above invention, more preferable embodimemt is characterized in that the above polygons include the translucent polygons and opaque polygons, and the opacity $\alpha_n$ of the translucent polygon is set to $1>\alpha_n>0$, and the opacity $\alpha_n$ of the opaque polygon is set to $\alpha_n=1$. According to this embodiment, polygons can be rendered sequentially from the front without differentiating between translucent polygons and opaque polygons.

Also in the above invention, more preferable embodiment is characterized in that the above rendering processing part omits processing for the nth or latter polygons when the above accumulated transparency value is zero transparency or less than a predetermined minimum value $X_{min}$ in the processing for the nth polygon. Because of the above configuration, the processing of a polygon overlapping behind (at the back of) an opaque polygon and the processing of a polygon overlapping behind (at the back of) a translucent polygon having a higher opacity a can be omitted and the efficiency of rendering processing can be improved.

To achieve the above objects, in another aspect of the present invention, polygons are sequentially processed from the front in the display screen for general blending processing as well. This invention is an image processing unit which executes predetermined blending processing for a plurality of polygons to generate image data to be displayed, comprising: a rendering processing part where the color data $T_n$ and data on a destination mixing coefficient $DE_n$ and source mixing coefficient $SR_n$ are provided to the nth polygon of the polygons sequentially arranged from the front in the display screen, then the color data $T_n$, the destination mixing coefficient $DE_n$ and the source mixing coefficient $SR_n$ of the polygon are supplied to the polygons sequentially from the front, and the color data $T_n$ of the nth polygon is added to the image data $D_{n-1}$ up to the (n-1)th polygon according to the above destination mixing coefficient $DE_n$ and the accumulated value $X_{n-1}$ of the source mixing coefficients $SR_1-SR_{n-1}$ of the (n-1)polygons positioned at the front.

By selecting an appropriate destination mixing coefficient $DE_n$ and source mixing coefficient $SR_n$ in the above invention, various blending processings can be executed and the rendering processing part which executes general blending processing can be provided.

The present invention also provides an image processing method of the above processor and a recording medium where a program for a computer to execute the image processing method are recorded.

BRIEF DESCRIPTION OF THE DRAWINGS

FIG. 2A and FIG. 2B are tables showing arithmetic expressions when the rendering processing of the present invention and of prior art are applied to the example in FIG. 1;

FIG. 3A and FIG. 3B are tables showing examples when the arithmetic expressions of the rendering processing shown in FIG. 2 are applied to embodiments;

DESCRIPTION OF THE PREFERRED EMBODIMENTS

Embodiments of the present invention will now be described with reference to the accompanying drawings. The technical scope of the present invention, however, is not restricted by the embodiments.

Figure 1:
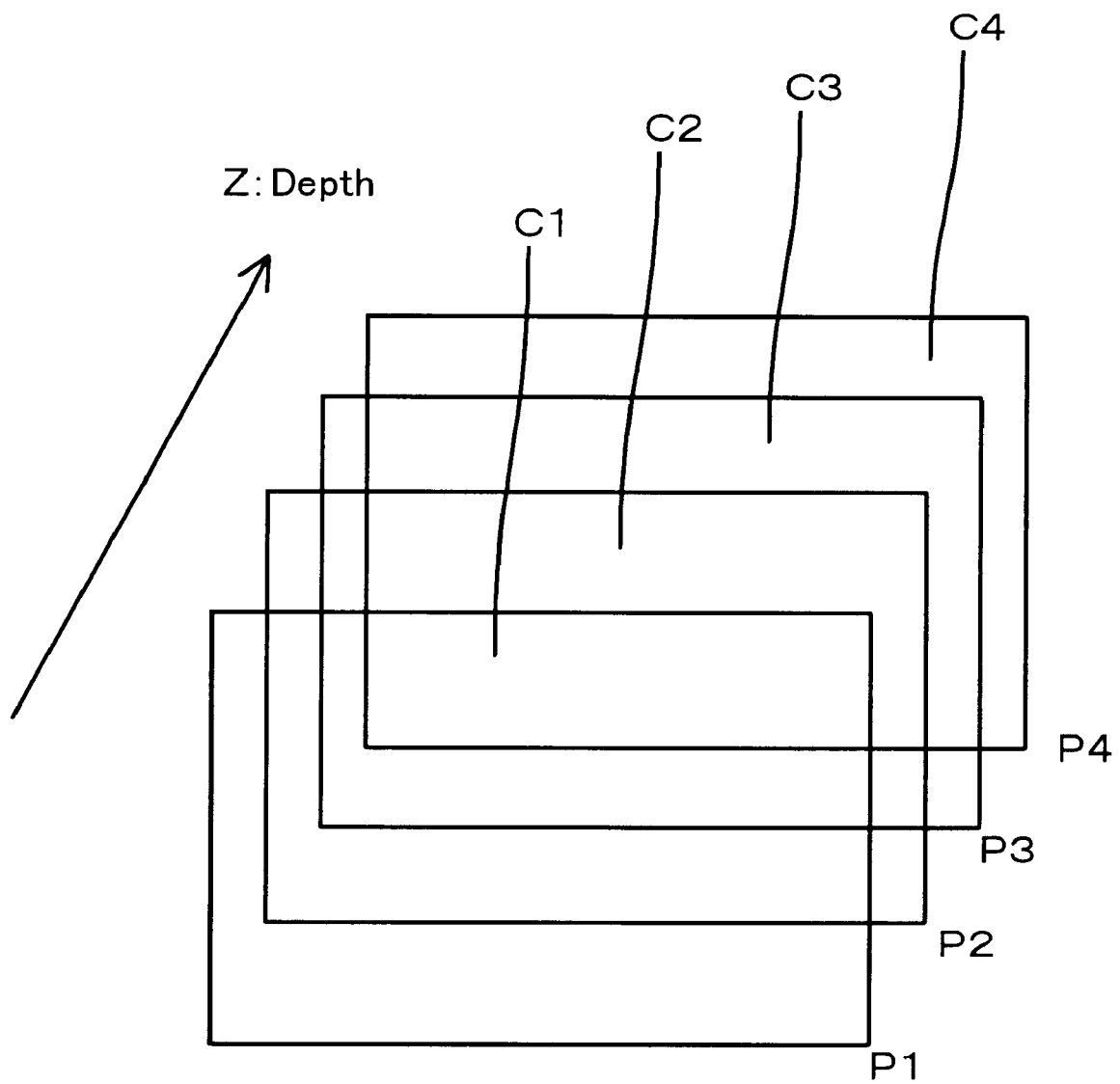
FIG. 1 is a drawing depicting an example of overlapping translucent polygons.

FIG. 1 is a drawing depicting an example of overlapping translucent polygons. In this example, three translucent polygons, P1, P2 and P3, and one opaque polygon, P4, overlap sequentially from the front in the depth direction (Z-value) in the display screen. Therefore the image data C4 of the region $C_4$ is the same as the color data $T_4$, which is created from the texture data of the opaque polygon P4 according to environment light and other factors.

In this description, the color data T of a polygon includes color data on the polygon, texture data, which is color data including patterns, or color data after shading processing is executed on the texture data and color data on the polygon. Color data T of a polygon refers to one of these color data. Color data determined by blending processing is image data C to be used for display. Therefore the color data C is also a kind of color data.

That is, $C_4 = T_4$ (1).

The image data of the region C3, where the translucent polygon P3 overlaps with the opaque polygon P4, is color data where the color data of the polygons P4 and P3 are blended according to the opacity $\alpha_3$ of the translucent polygon P3 (opaque when $\alpha_3=1$, transparent when $\alpha_3=0$, and translucent when $1>\alpha_3>0$) and the color data $T_3$. In other words, according to a conventional general rendering method, the color data of the region C3 is given by $$C_3 = \alpha_3 T_3 + (1-\alpha_3) C_4 \quad (2).$$

In the same way, the image data $C_2$ of the region C2 is determined from the opacity $\alpha_2$ of the translucent polygon P2, the color data $T_2$ and the color data $C_3$ of the region C3 by $$C_2 = \alpha_2 T_2 + (1-\alpha_2) C_3 \quad (3),$$

and the image data of the region C1 is also determined by $$C_1 = \alpha_1 T_1 + (1-\alpha_2) C_2 \quad (4).$$

As described above, rendering processing for translucent polygons generally requires blending processing in a region overlapping with another polygon while recursively referring to the image data $C_{n+1}$ which is positioned at the back, therefore in general, rendering processing of polygons is executed sequentially from the back in the display screen.

The present invention, however, is characterized in that the rendering processing for polygons is executed from the front in the display screen so as to solve the above mentioned problems. According to the present invention, C1 is given by $$C_1 = \alpha_1 T_1 + (1-\alpha_1)\{\alpha_2 T_2 + (1-\alpha_2)[\alpha_3 T_3 + (1-\alpha_3) C_4]\}$$

from the above expressions (2), (3) and (4), which is also expressed as $$C_1 = T_1\alpha_1 + T_2\alpha_2(1-\alpha_1) + T_3\alpha_3(1-\alpha_1)(1-\alpha_2) + C_4(1-\alpha_1)(1-\alpha_2)(1-\alpha_3) \quad (5).$$

Here the polygon P4 is assumed to be an opaque polygon with opacity data $\alpha_4=1$, and an arbitrary work data $X_n$ is defined as $$X_n = (1-\alpha_1)(1-\alpha_2)\ldots(1-\alpha_n) = X_{n-1}(1-\alpha_n) \quad (6).$$

Here, $X_0 = 1$.

If the above expression (6) is inserted into the expression (5), then $$C_1 = T_1\alpha_1 X_0 + T_2\alpha_2 X_1 + T_3\alpha_3 X_2 + C_4 X_3$$
$$= T_1\alpha_1 X_0 + T_2\alpha_2 X_1 + T_3\alpha_3 X_2 + T_4\alpha_4 X_3$$

and if the respective $T_n \alpha_n X_{n-1}$ is noted, then $$D_n = D_{n-1} + T_n\alpha_n X_{n-1} \quad (7).$$

Here $D_0 = 0$. As a result, if $n=4$ then $D_4 = C_1$.

In other words, if the blending processing is executed by providing the color data $T_n$ and the opacity $\alpha_n$ for polygons sequentially from the front in the display screen as data of the polygon, and by executing arithmetic processing for all the overlapping polygons using the above expressions (6) and (7), then the image data $D_n$, which is finally obtained, becomes the same as the image data $C_1$ of the region C1 overlapping four polygons in FIG. 1. Therefore, the image data $D_n = D_{n-1} + T_n \alpha_n X_{n-1}$ can be determined using the newly defined work data $X_n$. As the index of these expressions clearly show, it is unnecessary to recursively call up data of the polygon at the back in these arithmetic operations.

FIG. 2 is tables showing arithmetic expressions when the rendering processing of the present invention, which uses the above arithmetic operation, is applied to the example in FIG. 1. FIG. 2A is the case of the present invention, and FIG. 2B is the case of a prior art.

In accordance with the rendering processing of a prior art, for translucent polygons, image data $C_4$ of the region $C_4$ is determined using the color data $T_4$, the opacity $\alpha_4$ and the initial value $C_5$ of the polygon $P_4$ at the back, and the image data $C_3$ of the region $C_3$ is determined using the color data $T_3$, the opacity $\alpha_3$ and the previous value $C_4$ of the polygon P3, which is one polygon at the front, as shown in the table in FIG. 2B. Also, image data $C_2$ of the region C2 and image data $C_1$ of the region C1 are sequentially determined as shown in the table in FIG. 2B.

In accordance with the present invention, on the other hand, the image data $D_1$ during processing is determined using the color data $T_1$, opacity ai of the polygon P1, initially positioned closest to the viewer, and initial values $X_0$ and $D_0$, and the next image data $D_2$ during processing is determined using the color data $T_2$, opacity $\alpha_2$ of the polygon P2, which is a positioned at the back, and the above mentioned image data $D_1$, according to the above expressions (6) and (7). In the same way, the next image data $D_3$ and $D_4$ during processing are determined, and the final image data $D_4$, when processing for the data of all polygons ends, is used as the image data $C_1$ of the region C1.

Therefore, in accordance with the present invention, rendering processing for the translucent polygons can be sequentially processed using the data (color data T and opacity data $\alpha$) of the polygon at the front. Also, as a later mentioned embodiment shows, in rendering processing for a polygon positioned at a deeper location, work data $X_{n-1}$ has the tendency to be smaller, and also the image data $D_n$ during processing, which is determined using the work data $X_{n-1}$, has the tendency to change less. Therefore when the work data $X_{n-1}$ gets small enough or approaches 0, images to be displayed are barely influenced even if the rendering processing for data of the polygons positioned at deeper locations is omitted.

Also in the above rendering operation, opaque polygons can be processed applying the above arithmetic operation merely by setting the opacity $\alpha_n$ to 1 (opaque). In other words, when the opacity $\alpha_n=1$, work data $X_n$ becomes $X_n=0$. The rendering processing of the polygons positioned at deeper locations do not change the result, and rendering for the polygons positioned at deeper locations become substantially unnecessary. As a consequence, by using the rendering processing of the present invention, polygons can be sequentially processed from the front, without differentiating between translucent or opaque, even if translucent polygons and opaque polygons coexist.

The above mentioned work data $X_n$ is physically an accumulated value of the transparency $(1-\alpha)$ when the n number of polygons are overlapped. In other words, as the above expression (6) clearly shows, the work data $X_n$ is a value when the transparency $(1-\alpha)$ of each polygon is completely added up. When a polygon having high transparency, which is a polygon where $\alpha$ is close to 1, for example, is overlapped, the color data $T_n$ of the nth polygon positioned behind the polygons is added to the image data $D_{n-1}$ according to the accumulated transparency value of the (n−1) number of overlapped polygons at the front. Preferably, the color data $T_n$ according to the opacity $\alpha_n$ of the nth polygon is added. This is because the color data $T_n$ should not be added if the nth polygon is a transparent polygon ($\alpha_n=1$).

As described above, the rendering processing based on the above expression (7), $D_n=D_{n-1}+T_n \alpha_n X_{n-1}$, is first an processing of adding the color data $T_n$ of the polygon at the back to be processed to the image data $D_{n-1}$ for the overlapped (n−1) number of the polygons at the front according to the accumulated transparency value $X_{n-1}$ of the (n−1) number of polygons at the front.

Secondly, the rendering processing based on the above expression (7) is an processing of adding the color data $T_n$ to the image data $D_{n-1}$ according to the transparency of the currently processing polygon. In other words, the component of the color data $T_n$ according to the opacity $\alpha_n$ of the currently processing polygon is added to the image data $D_{n-1}$ of the (n−1) number of overlapped polygons according to the accumulated transparency value $X_{n-1}$ of the (n−1) number of polygons at the front.

When the initial value $X_0$ of the accumulated transparency value $X_n$ is $X_0=1$, this means that no other polygons exist in front of the first polygon, so the transparency is at a maximum. Therefore the color data $T_1$ of the first polygon can be used as the image data $D_1$. At this time, components of the color data $T_1$ according to the opacity $\alpha_1$ of the first polygon itself is used as the image data $D_1$. When the initial value $D_0$ of the image data $D_n$ is $D_0=0$, this means that the luminance value is 0, that is, a black state without any color components. The initial value $D_0$ of image data does not have to be black.

FIG. 3 is tables showing examples when the arithmetic operation of the rendering processing shown in FIG. 2 is applied to embodiments.

These embodiments are cases when the color data $T_1-T_4$ (color data obtained considering texture, environmental light and other factors) and the opacity $\alpha_1-\alpha_4$ of each polygon P1–P4 in FIG. 1 are $T_1$=red . . . R=1.0, G=0, B=0, $\alpha_1$=0.5
$T_2$=blue . . . R=0, G=0, B=1.0, $\alpha_2$=0.5
$T_3$=yellow . . . R=1.0, G=1.0, B=0, $\alpha_3$=0.5
$T_4$=black . . . R=0, G=0, B=0, $\alpha_4$=1.0

This polygon data is shown in the tables at the left in reverse order, and rendering results using this polygon data are shown in the tables at the right.

As this rendering result shows, the image data $D_4$ finally obtained is the same as the image data $C_1$ determined by a conventional rendering operation.

In the rendering processing of the present invention shown in FIG. 3, in physical terms, a component of the color data $T_1$ according to the opacity $\alpha_1$ becomes the image data $D_1$ for the first polygon (n=1). For the second polygon (n=2), a component of the color data $T_2$ according to the opacity $\alpha_2$ is added to the image data $D_1$ according to the transparency $(1-\alpha_1)$ of the first polygon, which is in front of the second polygon. In other words, out of color data 1.000 of blue B of the second polygon, the component 0.5 according to its opacity $\alpha_2$=0.5 is added to the data 0.0 of the blue B up to the first polygon according to the transparency $1-\alpha_1$=0.5 of the first polygon, which is in front of the second polygon, and the image data therefore becomes 0.25.

For the color data 1.0 of red R and green G of the third polygon, a component of the transparency $\alpha_3$=0.5 is added to the image data of red R and green G up to the second polygon, 0.5 and 0.0 respectively, according to the accumulated transparency value of the first and second polygons, that is, $X_2$=0.5×0.5=0.25 respectively. This means that 0.125 is added respectively. For the fourth polygon, final image data is unchanged since opacity $\alpha_4$=1 while all of the color data $T_4$ is 0.

As described above, in the rendering processing in the example in FIG. 3A, the polygons are processed sequentially from the front, and when the next polygon behind is rendered, a component according to the opacity of the color data of the currently processing polygon is added to the image data according to the accumulated transparency value of the overlapping polygons at the front.

As the table on the rendering result of the present invention in FIG. 3A shows, when a rendering operation is executed for polygons sequentially from the front, the value of work data $X_n$ gradually decreases. When $X_4$=0, the image data $D_n$ no longer changes by a subsequent operation, although this is not shown in the table. When the value of work data $X_{n-1}$ decreases, the image data $D_n$ to be obtained next does not change very much from the previous image data $D_{n-1}$, as the expression $D_n=D_{n-1}+T_n \alpha_n X_{n-1}$ shows, although this too is not shown in the table.

As a consequence, even if rendering processing for the polygons positioned at deeper locations, waiting for processing, is omitted due to the limited operation time between frames, image data to be displayed is not affected very much.

In physical terms, a decrease in the work data $X_{n-1}$, which is an accumulated transparency value of overlapping polygons, means a deterioration of transparency, and in this case, the polygons positioned at deeper locations hardly affect the image data.

Figure 4:
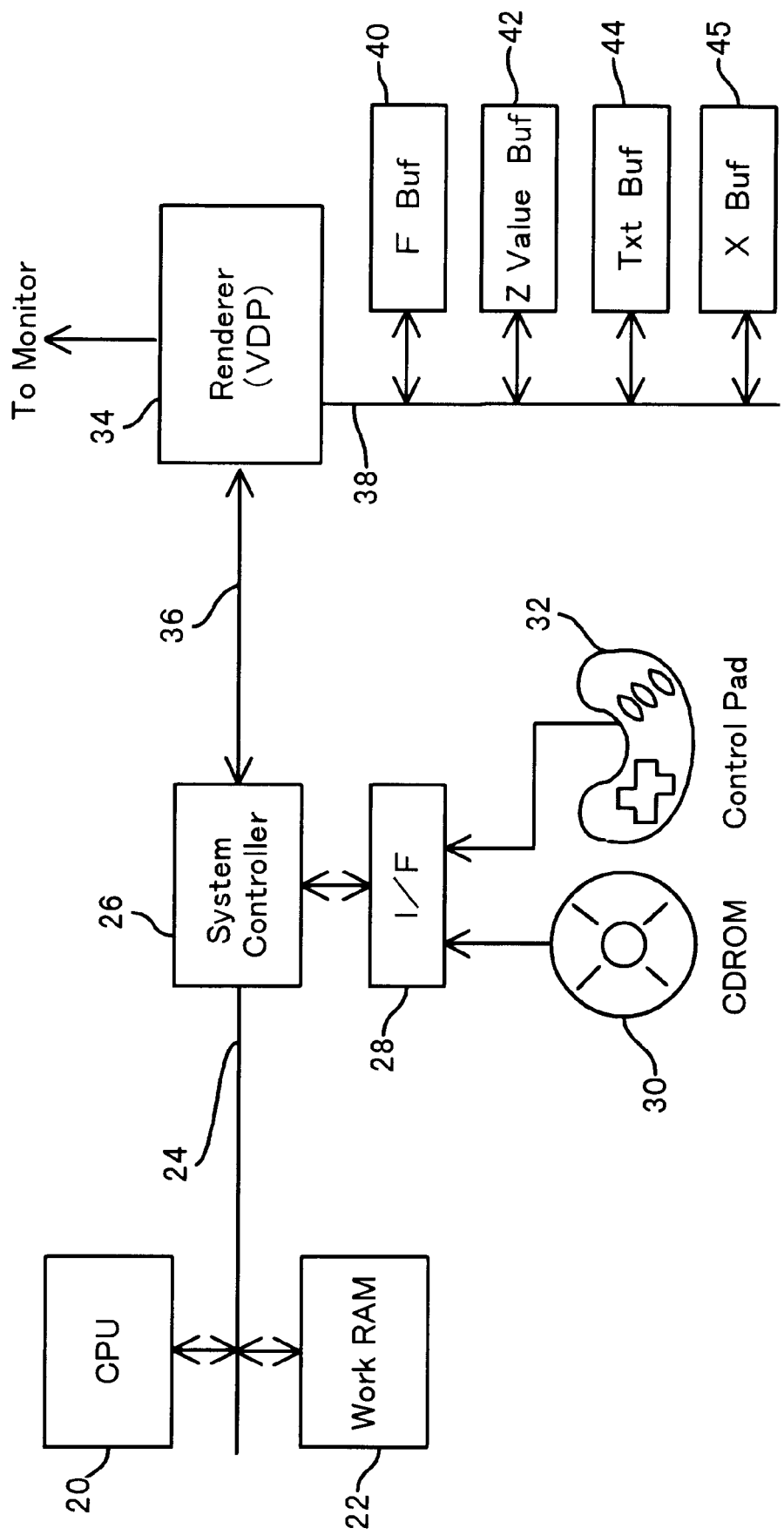
FIG. 4 is a drawing depicting an example of the configuration of a game machine in accordance with the image processing unit of the present invention.

FIG. 4 is a drawing depicting an example of the configuration of a game machine in accordance with the image processing unit of the present invention. In the game machine shown in FIG. 4, CPU 20 executes a game program and generates drawing commands to generate images which change synchronizing with the progress of the game. The drawing commands include coordinates of vertexes of a polygon, and texture coordinates and opacity data of the vertexes. The CPU 20 is connected via a Bus 24 with a work RAM 22, which is used during execution of the game program.

The Bus 24 is connected to a system controller 26, which is an interface between the CPU 20 and the renderer 34 which mainly draws images. The system controller 26 transfers the drawing commands and other commands issued by the CPU 20 to the renderer 34. The system controller 26 is connected to an external interface 28, so as to be connected to an external storage medium 30 where the game program and the data on objects required for the game are recorded, such as a CD-ROM, and to a control pad 32 for inputting control input.

The renderer 34 for drawing images is comprised of a video digital processor, for example, and is connected to the frame buffer 40, a Z-data buffer 42, a texture buffer memory 44 and an X buffer memory 45 via a bus 38. The renderer 34 reads texture data from the texture buffer 44, executes rendering processing, and stores the image data to be drawn in the frame buffer 40, responding to drawing commands and other commands sent from the CPU 20 via the system controller 26. The renderer 34 also stores the Z-data which indicates the depth of the pixels to be drawn in the display screen in the corresponding positions of the Z-data buffer 42. When image data for one frame is stored in the frame buffer 40, the renderer 34 sends the image data to a monitor, not illustrated here, so as to display the images of the game on the monitor screen.

Control input, which is input by the player of the game machine, is stored to the work RAM 22 via the system controller 26 from the control pad 32. Responding to this control input, the CPU 20 executes the game program and issues drawing commands for the objects to be generated in real-time. This drawing command includes polygon data, as mentioned above, and the drawing command is supplied to the polygons sequentially from the front in the display screen by executing sorting processing according to the Z-data, which indicates depth, in advance.

Figure 5:
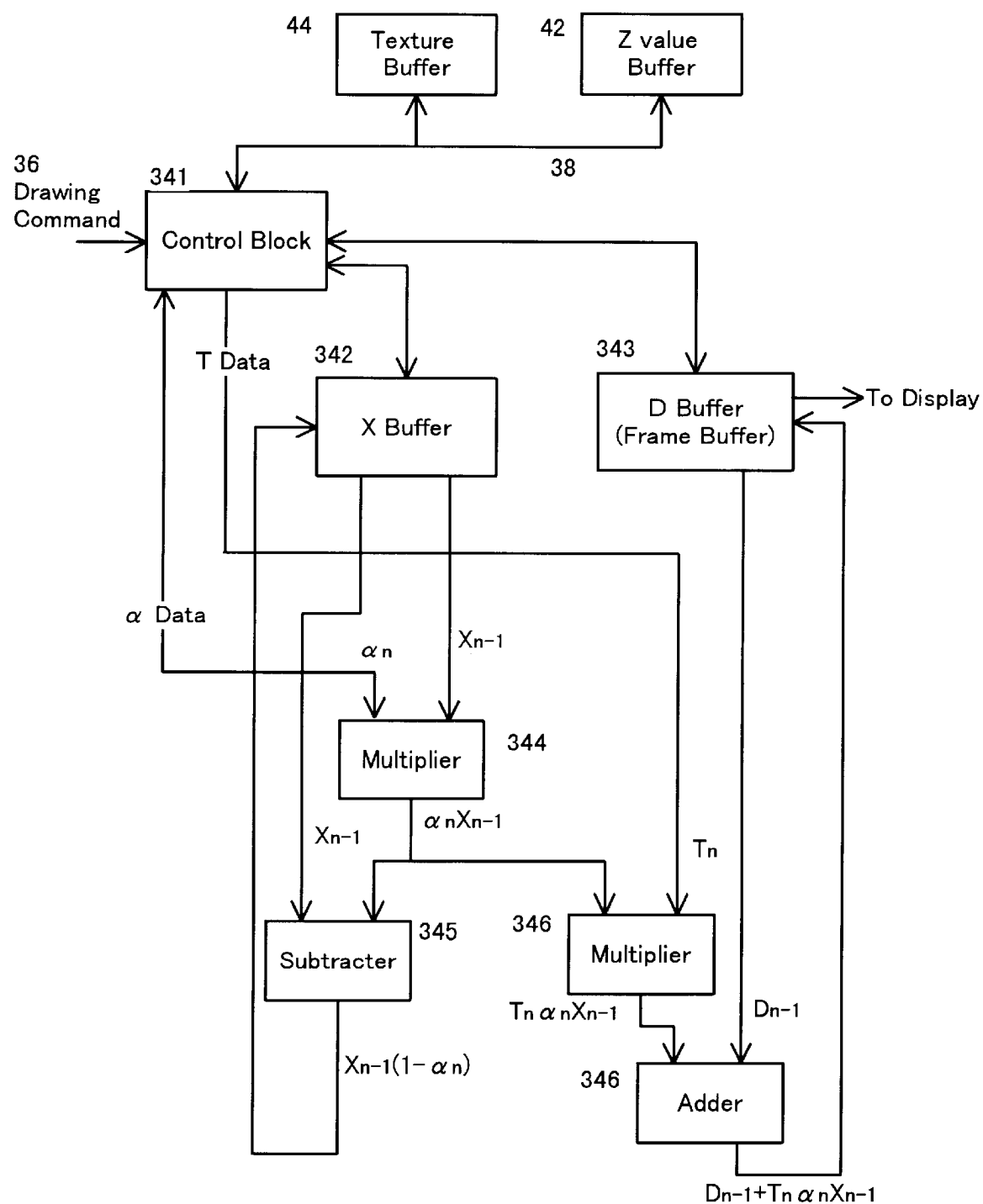
FIG. 5 is a block diagram depicting a renderer in an embodiment of the present invention.

FIG. 5 is a block diagram depicting a renderer in an embodiment of the present invention. FIG. 5 shows a part of the internal structure of the renderer 34 along with the Z value buffer 42 and the texture buffer 44 shown in FIG. 4. A control block 341 is connected to the system controller 26 via the bus 36, and is connected to the texture buffer 44 and the Z value buffer 42 via the bus 38. The control block 341 receives drawing commands issued by the CPU 20, reads the texture data (a kind of color data) from the texture buffer, executes predetermined processing according to the Z-values in the Z-value buffer, and controls the rendering processing operation in the renderer 34. In the embodiment in FIG. 5, the texture data is used as a color data of polygons, therefore the above mentioned color data T of the polygons is substituted by the texture data T.

The control block 341 is also connected to an X buffer memory 342 for storing the work data $X_n$ for each predetermined number of pixels, and to a D buffer memory 343 for storing the image data $D_n$ for each predetermined number of pixels, and the control block 341 assigns initial values to these buffer memories 342 and 343 and stores the operation results in the respective memories. The X buffer memory 342 and the D buffer memory 343 are equivalent to or can be substituted by the X buffer 45 and the frame buffer 40 in FIG. 4 respectively.

A multiplier 344 generates a multiplied value $\alpha_n X_{n-1}$ of the work data $X_{n-1}$ from the X buffer 342 and the opacity $\alpha_n$ of the processing pixel in the currently processing polygon supplied with the drawing command. A subtracter 345 generates the subtracted value $X_{n-1}(1-\alpha_n)$ of the multiplied value $\alpha_n X_{n-1}$ and the work data $X_{n-1}$ and the subtracted value $X_{n-1}(1-\alpha_n)$ is recorded in the area corresponding to the original pixel in the X buffer 342 as a new work data $X_n$.

A multiplier 346, on the other hand, generates a multiplied value $T_n \alpha_n X_{n-1}$ of the multiplied value $\alpha_n X_{n-1}$ generated by the multiplier 344 and the texture data (color data) $T_n$ corresponding to the processing pixel of the currently processing polygon. An adder 347 generates an added value $D_{n-1}+T_n \alpha_n X_{n-1}$ of the multiplied value $T_n \alpha_n X_{n-1}$ and the image data $D_{n-1}$ in the D buffer 343, and stores the value in the area corresponding to the pixels in the D buffer memory 343 as a processed image data Dn.

The control block 341 completes the above rendering processing within the time between frames and supplies the accumulated final image data D in the D buffer memory 343 to the display, not illustrated here, to display the image. The control block 341 also supervises the value of the work data $X_n$ in the X buffer 342, and if the work data $X_{n-1}$ is smaller than a predetermined minimum value $X_{min}$ or if the work data $X_{n-1}$ is 0, the control block 341 does not output the data $X_{n-1}$ and $D_{n-1}$ from the X buffer 342 and the D buffer 343, so as to stop any subsequent rendering processing operation, and stops supplying the texture data $T_n$ and the opacity data $\alpha_n$ which are obtained or generated by a drawing command. In this way, the control block 341 controls the start and end of a rendering processing operation.

Figure 6:
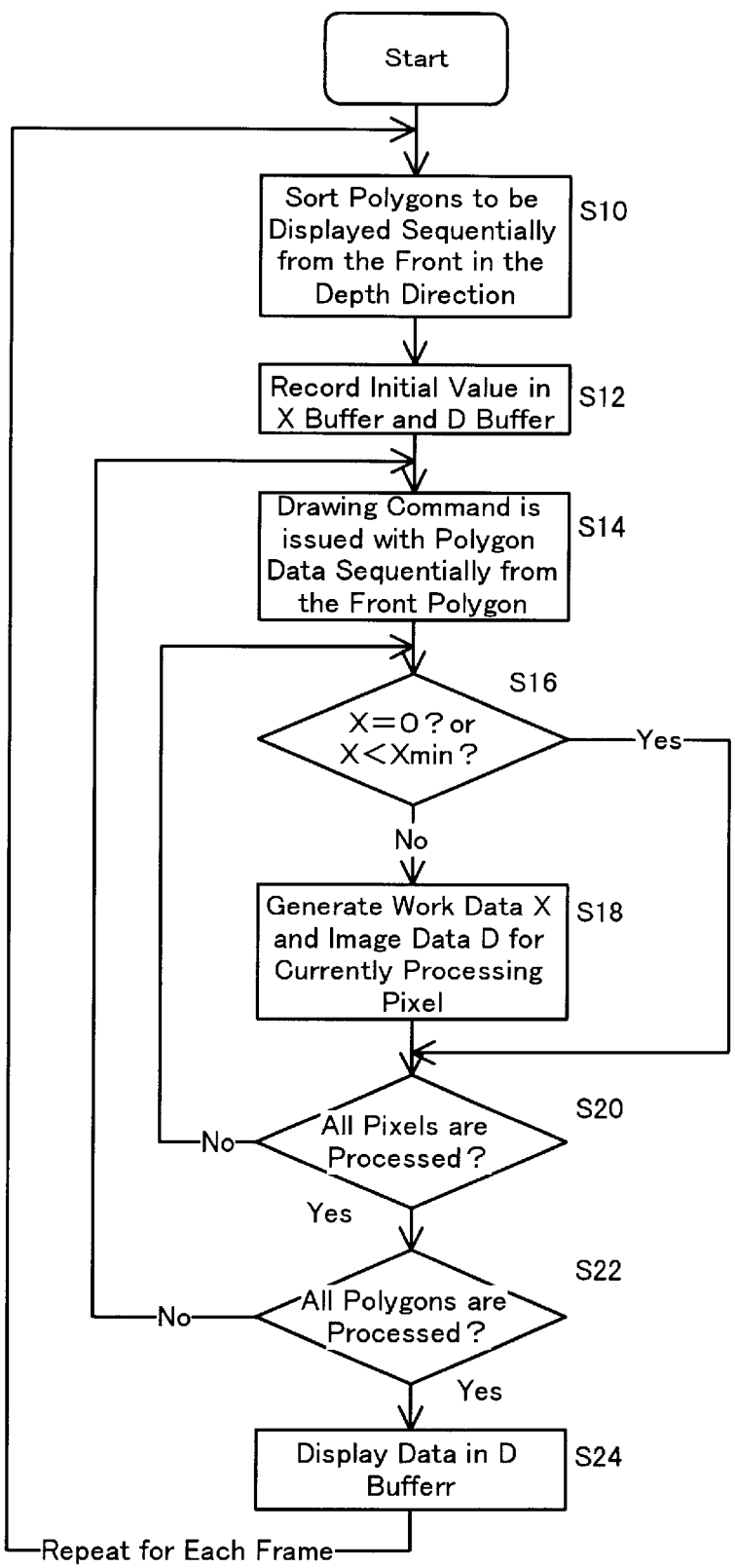
FIG. 6 is a flow chart depicting the image processing of the present invention.

FIG. 6 is a flow chart depicting image processing of the present embodiment. According to FIG. 6, the flow of image processing for one frame will be explained. At first, responding to the control input supplied from the control pad 32, the CPU 20 executes the game program in the RAM 22, and generates the polygon data to be displayed. This polygon data is sorted sequentially from the polygon at the front in the depth direction in the display screen (S10). These polygons include translucent polygons and opaque polygons. The polygon data includes vertex coordinates and opacity data, color data and texture coordinate data of these vertexes.

The texture data of the polygon is recorded in the texture buffer 44 in advance. The texture coordinate of the processing target pixel is determined from the texture coordinates of the polygon included in the drawing command, and the texture data in the texture buffer 44 is read. The color data of pixels of the polygon is determined as the color data in white light, which is attribute data of the polygon, and color data in environment light. This color data is collectively called "texture data" in this description.

The control block in the renderer 34 first records the initial values $X_0=1$ and $D_0=0$ in the X buffer 342 and the D buffer 343 in the renderer (S12). Then the drawing command is issued with polygon data sequentially from the front polygon (S14). From this polygon data, the control block 341 generates the texture data (color data) $T_n$ for the currently processing pixel, referring to the texture buffer 44. From the polygon data, [the control block 341] also generates the opacity data $\alpha_n$ for the currently processing pixels.

Then the control block 341 determines the work data $X_n$ and the image data $D_n$ during processing using the multipliers 344 and 346, subtracter 345 and adder 346 shown in FIG. 5, and records the new data $X_n$ and $D_n$ in the X buffer 342 and D buffer 343 (S18). In other words, in the rendering processing in the process S18, accumulated transparency value $X_n$ for the overlapped n polygons is determined, and the component of the texture data (color data) $T_n$ of the nth polygon according to the opacity $\alpha_n$ of the nth polygon is added to the image data $D_{n-1}$ up to the (n−1) number of polygons according to the accumulated transparency value $X_{n-1}$ of the (n−1) number of polygons positioned at the front.

The above generation of work data X and image data D for the pixel is repeated for all pixels of the polygon (S20). However, when the work data $X_{n-1}$ obtained as a result of the rendering operation becomes 0 or when the work data $X_{n-1}$ becomes less then the predetermined minimum value $X_{min}$, the subsequent rendering operation for pixels of the polygons positioned at deeper locations is omitted and rendering processing of the next pixel is executed (S16).

When rendering processing of pixels of one polygon ends, rendering processing for the subsequent polygon in the back is continuously executed (S22). And finally, the image data D recorded in the D buffer 343 is supplied to the display where the image is displayed.

When the above generation of image data of a frame exceeds the time between frames, rendering processing for the polygons positioned at deeper locations can be stopped. In other words, when the control block 341 manages the time between frames and when there are too many polygons to be rendered and processing of the polygons does not complete within the time, rendering processing of the frame can be force-ended. Even when such a force-end is executed, smooth movement of images is not disrupted since processing of relatively important polygons positioned at the front among the images to be displayed has been completed.

Depending on the shape and position of polygons, two polygons may cross in the depth direction. In such a case, a part of one polygon is positioned at the front of a part of the other polygon, and the remaining part of the former polygon is positioned at the back of the remaining part of the latter polygon. Even in such a case, pixels at the front must be processed first in the above mentioned rendering processing. Therefore in this case it is effective to compare the Z-value of the currently processing pixel and the Z-value of pixels recorded in the Z-value buffer, and to execute the above rendering operation if the Z-value of the currently processing pixel is deeper.

In the above embodiment, the opaque polygons and translucent polygons can be processed together even if they coexist, as explained referring to the flow chart, but when the opaque polygons and translucent polygons are processed separately as is done conventionally, the above rendering processing may be used for processing the translucent polygons. In this case as well, images can be reproduced maintaining smooth movement of images without having a major influence on the images, even if the number of polygons that can be processed within a predetermined time is smaller than the number of polygons to be processed.

[Application to General Blending Processing]

In the above embodiment, an example of processing polygons sequentially from the front when color of a translucent polygon and color of a polygon positioned at the back are blended with opacity $\alpha$ was explained. A graphic library using a standard computer, however, can perform various blending processings as standardized by Open GL (Graphic Library), for example. In such generalized blending processing, color data $FBm-1$ in a frame buffer, which was processed and determined previously, and color data $PIXm$ of a currently processing pixel, are blended with the source mixing coefficient $SRm$ and the destination mixing coefficient $DEm$ respectively. If an arithmetic expression is used, the color data $FBm$, which will be determined by current processing and stored in the frame buffer, is given by $$FBm=PIXm*DEm+FBm-1*SRm \qquad (8).$$

Here m is an integer, and the blending processing is executed sooner as m becomes smaller. (* denotes the product. This is the same throughout this description.)

In the above blending arithmetic expression, the source mixing coefficient $SRm$ and the destination mixing coefficient $DEm$ are selected from the following eleven types.

0, $FBn-1$, $PIXn$, $PIXn*\alpha$, $FBn-1*\alpha$, 1, $1-FBn-1$, $1-PIXn$, $1-PIXn*\alpha$, $1-FBn-1*\alpha$, smaller one of ($FBn-1*\alpha$, $1-PIXn*\alpha$).

As the above expression (8) shows, a general blending processing requires color data in the frame buffer before drawing, and the operation result also depends on the drawing sequence. Therefore in general computer graphics, polygons which require blending processing are normally drawn sequentially from a polygon at the back.

Figure 7:
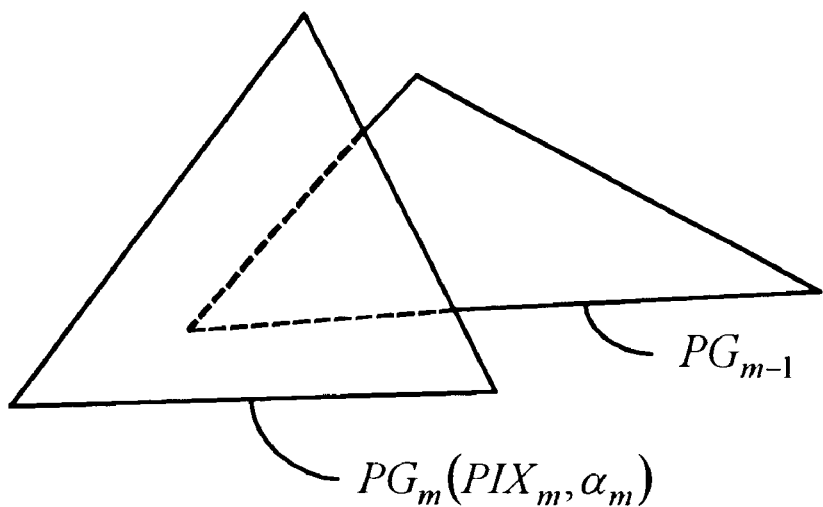
FIG. 7 is a drawing depicting blending processing of translucent polygons.

FIG. 7 is a drawing depicting blending processing of translucent polygons. This is a case when the translucent polygon $PGm$ at the front and the polygon $PGm-1$ at the back are partially overlapped, and the opacity of the translucent polygon $PGm$ at the front is $\alpha$. In this case, as explained for prior art, the color data $FBm-1$ of the polygon $PGm-1$ at the back is determined first, and this color data $FBm-1$ and the color data $PIXm$ of the translucent polygon $PGm$ at the front are blended with opacity $\alpha m$ and transparency $(1-\alpha n)$. In other words, the arithmetic expression is given by $$FBm=PIXm*\alpha m+FBm-1*(1-\alpha m) \qquad (9)$$

as shown in the drawing. This means that the above expression (9) is the same as the case when the destination mixing coefficient $DEm=\alpha m$ and the source mixing coefficient $SRm=(1-\alpha m)$ are set in the above general expression (8).

Figure 8:
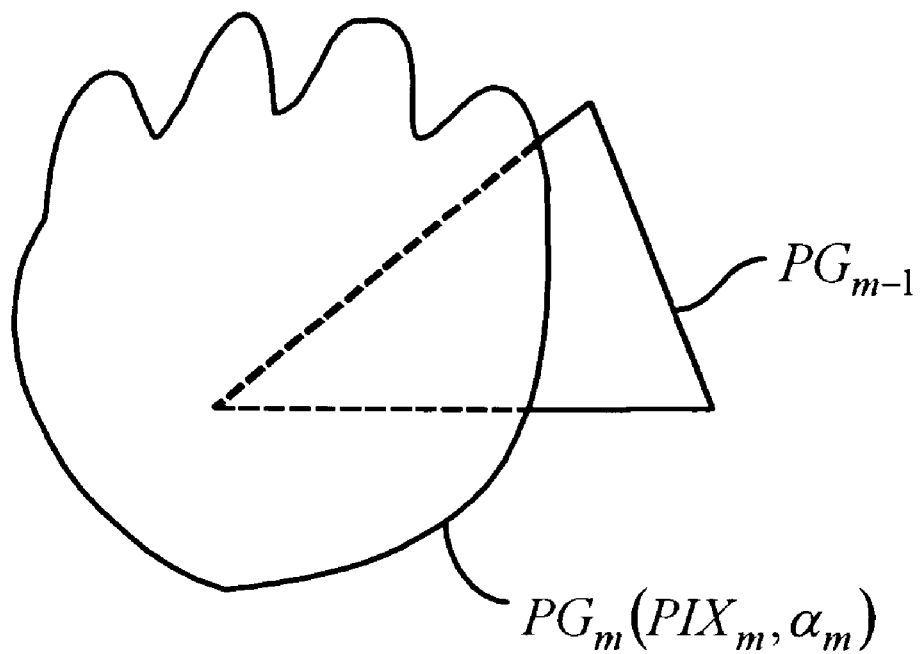
FIG. 8 is a drawing depicting an embodiment of auxiliary filtering processing.

FIG. 8 is a drawing depicting an embodiment of auxiliary filtering processing. A general graphic library uses auxiliary filtering processing as blending processing. In this process, unlike the blending processing of the translucent polygons in FIG. 7, the color data $FBm-1$ of the polygon $PGm-1$ at the back remains without attenuation, regardless the mixing coefficient $\alpha m$ of the polygon $PGm$ at the front.

Let us assume the case when the polygon $PGm$ at the front is a polygon which corresponds to a flame, and the polygon $PGm-1$ at the back is a predetermined opaque polygon. In this case, a viewer is looking at the opaque polygon $PGm-1$ through the flame polygon $PGm$ from a viewpoint. At this time, the color of the flame polygon $PGm$ is added but the color data of the polygon $PGm-1$ at the back is not attenuated.

In such a case, the above general expression (8) can be used by setting the destination mixing coefficient $DEm=\alpha m$ and the source mixing coefficient $SRm=1$ for the color data $PIXm$ of the flame polygon $PGm$. As a result, the arithmetic expression of auxiliary filtering processing is given by $$FBm=PIXm*\alpha m+FBm-1*1 \qquad (10)$$

as FIG. 8 shows. In other words, in this processing, the color data $FBm-1$ of the polygon $PGm-1$ determined in the previous processing is used as is, and the color data $PIXm$ of the currently processing polygon $PGm$ for the amount of mixing coefficient $\alpha m$ is added.

This auxiliary filtering processing is also applied when a light from a red light source is irradiated to a polygon $PGm-1$, for example, as well as the above example of the flame polygon.

Figure 9:
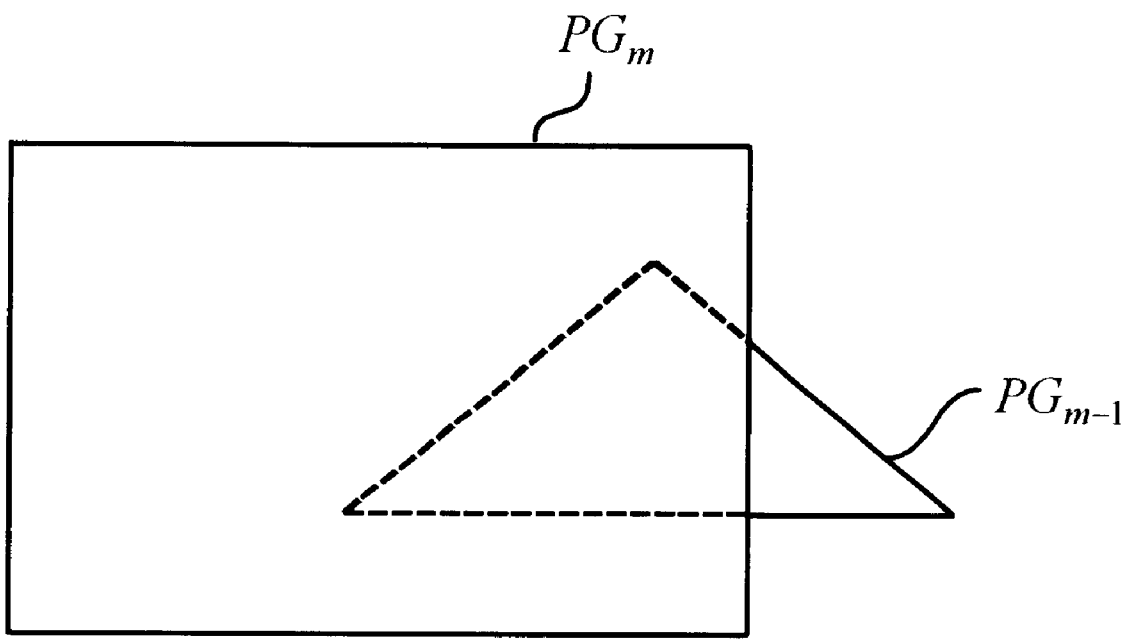
FIG. 9 is a drawing depicting color filtering processing.

FIG. 9 is a drawing depicting color filtering processing. In color filtering processing, only a specific color component of the polygon $PGm-1$ in the background is extracted, for example, therefore the color polygon $PGm$, which does not have color components, is arranged at the front. In this blending processing operation where a specific color component is extracted, the color data $FBm-1$ of the polygon $PGm-1$ in the background is multiplied by the color extraction data $PIXm$ of the color filter polygon $PGm$.

In other words, the arithmetic expression is $$FBm=PIXm*0+FBm-1*PIXm \qquad (11),$$

as shown in FIG. 9. This arithmetic expression is obtained by setting the destination mixing coefficient $DEm=0$ for the color extraction data $PIXm$ of the color filter polygon $PGm$, and source mixing coefficient $SRm=PIXm$ for the previously determined color data $FBm-1$.

As described above, other than blending processing of translucent polygons, various blending processings, such as auxiliary filtering processing and color filtering processing, can be executed by applying appropriately selected destination mixing coefficient $DEm$ and source mixing coefficient $SRm$ to the general expression (8). Various blending processings become possible if the normal computer graphics processing unit is configured such that the above general expression (8) is applied, and the destination mixing coefficient $DEm$ and source mixing coefficient $SRm$ are appropriately selected.

Now, a method and processing unit for processing polygons sequentially from the viewpoint side (front) for the above mentioned general blending processing will be explained.

Just as in the case in FIG. 1, let us assume that four polygons are overlapped. In this case, the following four arithmetic expressions are derived from the general expression (8) depending on m=1–4.

$$FB_1=PIX_1*DE_1+FB_0*SR_1 \quad (21)$$

$$FB_2=PIX_2*DE_2+FB_1*SR_2 \quad (22)$$

$$FB_3=PIX_3*DE_3+FB_2*SR_3 \quad (23)$$

$$FB_4=PIX_4*DE_4+FB_3*SR_4 \quad (24)$$

The key point here is that in the above blending processing, a polygon more to the front is denoted as the value m becomes greater, and a polygon more to the back is denoted as the value m becomes smaller, since in the above blending processing, polygons are processed sequentially from the back and the color data is recorded in the frame buffer.

Now, for the above expressions (21)–(24), the color data $FB_4$ of the polygon at the extreme front is substituted by $D_1$, the color data $FB_1$ of the polygon at the extreme back is substituted by $D_4$, and the color data PIX of a currently processing pixel is substituted by the texture data (color data) T, just as in expressions (5), (6) and (7). That is, if $D_4=FB_1-D_2=FB_4$ and $PIX_4=T_1-PIX_2=T_4$, then $$D_4=T_4*DE_4+D_5*SR_4 \quad (31)$$

$$D_3=T_3*DE_3+D_4*SR_3 \quad (32)$$

$$D_2=T_2*DE_2+D_3*SR_2 \quad (33)$$

$$D_1=T_1*DE_1+D_2*SR_1 \quad (34)$$

If the work data $X_n$ ($X_0$=1) is $$Xn=SRn*Xn-1=SRn*SRn-1*SRn-2*\text{- - -}*SR1 \quad (35)$$

then the expression (34) becomes as follows.
$D_1=T_1*DE_1*X_0+T_2*DE_2*X_1+T_3*DE_3*X_2+T_4*DE_4*X_3$.
Therefore noticing on each $Tn*DEn*Xn-1$, this expression could be generalized as $$Dn=Dn-1+Tn*DEn*Xn-1 \quad (36).$$

In this case, as n becomes smaller, a polygon more to the front is denoted, so blending processing can be executed for polygons sequentially from the front. In other words, using processing result Dn-1 of the polygon positioned at the front, the data Dn of the polygon positioned next toward the back can be determined. If SRn and DEn are substituted by SRn=(1-αn) and DEn=αn in the above expressions, then these expressions become the same as the expressions (6) and (7) shown in the processing of translucent polygons.

According to the above expression (35), the work data Xn is an accumulated value of source mixing coefficient SRn. Also, according to the above expression (36), the color data Dn after processing the nth polygon from the viewpoint is determined by rendering processing where the texture data (color data) $T_n$ of the nth polygon is added to the image data $D_{n-1}$ up to the (n-1)th polygon according to the destination mixing coefficient DEn and accumulated value $X_{n-1}$ of the source mixing coefficients $SR_1-SR_{n-1}$ of the (n-1) number of polygons position at the front. When the work data Xn becomes smaller than a predetermined minimum value, omitting processing of subsequent polygons have little influence on the color data to be displayed, which is the same as the case of blending processing for translucent polygons.

Figure 10:
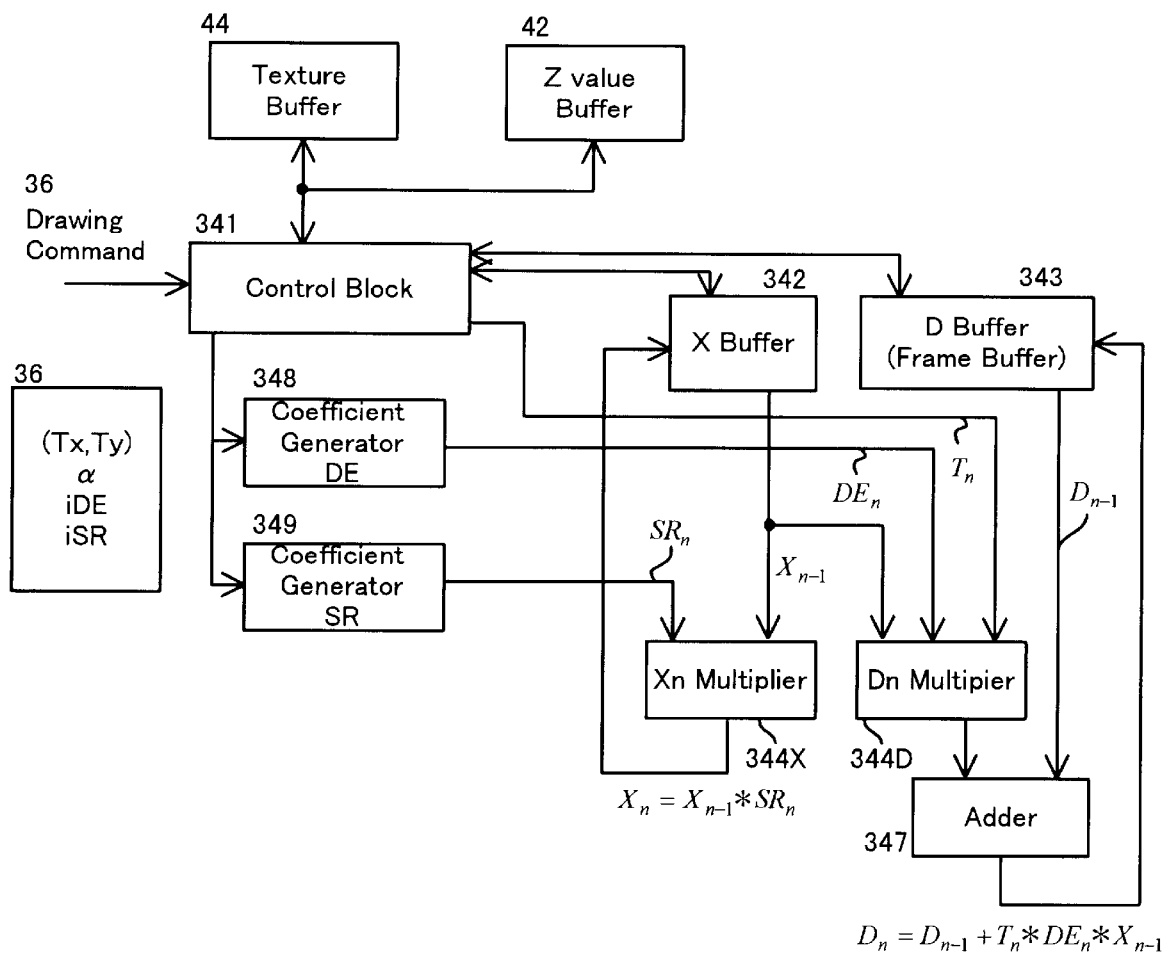
FIG. 10 is a block diagram depicting a general renderer used for blending processing in a general graphic library.

FIG. 10 is a block diagram depicting a general renderer used for blending processing in a general graphic library.

This is a configuration when configuration of the renderer in FIG. 5 is generalized and is applied to the renderer 34 in FIG. 4. In the configuration in FIG. 10, the same numerals as in FIG. 5 are used when the same elements are denoted.

Unlike the renderer in FIG. 5, the renderer in FIG. 10 has a destination mixing coefficient generation part 348 and a source mixing coefficient generation part 349, and the multiplier has the Xn multiplier 344X and the Dn multiplier 344D. The control block 341 receives the texture coordinate (Tx, Ty), opacity α and mixing coefficient generation information iDE and iSR as a drawing command 36. The other configuration is the same as in FIG. 5.

The mixing coefficient generation information iDE and iSR includes information on a destination mixing coefficient DE and a source mixing coefficient SR to be used according to a predetermined processing which is selected from generalized blending processings. Therefore, the mixing coefficient generation information iDE and iSR are provided to respective mixing coefficient generation parts 348 and 349, and these generation parts 348 and 349 generate the destination mixing coefficient DE and the source mixing coefficient SR, and supply them to the Xn multiplier 344X and the Dn multiplier 344D.

The control block 341 reads the corresponding texture data from the texture buffer 44 according to the texture coordinate (Tx, Ty) included in the drawing command, and supplies the texture data to the Dn multiplier 344D as the texture data (color data) Tn. The control block instructs the X buffer 342 and the D buffer 343 which is a frame buffer to access the address corresponding to the currently processing pixel, and the read data Xn-b 1and Dn-1 are supplied to the Xn multiplier 344X and the adder 347 respectively.

By the above general purpose renderer, blending processing is executed for polygons sequentially from the polygon closer to the viewpoint. And in the processing for the nth polygon, the Xn multiplier 344X determines the work data Xn from the work data Xn-1, which was recorded in the X buffer 342 after the previous processing and the source mixing coefficient SRn of this time. Also the Dn multiplier 344D and the adder 347 determine the color data Dn of this time, that is, Dn=Dn-1+Tn*DEn*Xn-1 from the work data Xn-1, which was recorded in the X buffer 342 after the previous processing, the destination mixing coefficient DEn of this time, and the color data Dn-1, which was recorded in the D buffer 343 after the previous processing. The determined work data Xn and the color data Dn are recorded in the X buffer 342 and the D buffer (frame buffer) 343 respectively.

The general renderer in FIG. 10 can execute the above three processings by selecting mixing coefficients as follows.

Blending processing of translucent polygons: DEn=αn, SRn=1-αn

Auxiliary filtering processing: DEn=αn, SRn=1

Color filtering processing: DEn=0, SRn=Tn Other than the above examples, various mixing coefficients can be selected. For example, 0, Tn*αn, 1, 1-Tn, 1-Tn*αn can also be selected. However, data FBn-1, that is, a mixing coefficient including the color data Dn+1 which is determined after processing later, cannot be selected.

In the case of a general renderer, it is preferable to have the configuration shown in FIG. 10 for each color component of R, G and B. When only the same mixing coefficient, such as 0, α, 1, or 1-α, is used for each color component of R, G and B, however, the renderer can be comprised of a common X buffer 342 and a D buffer 343 for each color component. When each color component has a different mixing coefficient, such as Tn and 1−Tn, the renderer must be comprised of an X buffer 342 and a D buffer 343 for each color component.

In the above general renderer as well, when the accumulated value of the source mixing coefficient SRn is smaller than a predetermined minimum value $X_{min}$ in blending processing for the nth polygon, processing for the nth or later polygons can be omitted so as to improve the overall efficiency of blending processing.

The above processing can be executed not by such hardware as the above mentioned general renderer but by software. In this case, a general purpose personal computer or workstation executes the above blending processing program.

In accordance with the present invention, as described above, polygons can be sequentially processed from the polygon at the front in the depth direction of the display screen when image processing for translucent polygons is executed, and even when all polygons to be processed are not processed, smooth movement of reproduced images is not affected, therefore high-speed processing is possible.

Also in accordance with the present invention, efficiency of processing opaque polygons can be improved even if translucent polygons are processed without differentiating the processing from opaque polygons, and the processing burden can be decreased since opaque polygons and translucent polygons need not be differentiated.

Also in accordance with the present invention, a general renderer which can execute general blending processing can be provided, and various blending processings can be executed for polygons sequentially from the polygon closest to the viewpoint by appropriately selecting the destination mixing coefficient and the source mixing coefficient.

What is claimed is:

1. An image processing unit which executes image processing for a plurality of polygons including translucent polygons, to generate image data to be displayed, wherein color data $T_n$, and opacity $\alpha_n$ or transparency $(1-\alpha_n)$, are assigned to the nth polygon of the polygons sequentially arranged from the front in a display screen, comprising:
    a rendering processing part where the color data $T_n$, and opacity $\alpha_n$ or transparency $(1-\alpha_n)$, of said nth polygon are supplied sequentially from said front, and the color data $T_n$ of the nth polygon is added to an image data $D_{n-1}$, which is provided by rendering processing up to the (n−1)th polygon, according to an accumulated opacity or transparency value $X_{n-1}$ of the (n−1) polygons positioned at the front.

2. The image processing unit according to claim 1, wherein;
    said rendering processing part adds components for the opacity $\alpha_n$ of the nth polygon out of the color data $T_n$ of said polygon to the image data $D_{n-1}$, which is provided by rendering processing up to the (n−1)th polygon, according to the accumulated transparency value $X_{n-1}$ of the (n−1) polygons positioned at the front.

3. The image processing unit according to claim 1 or 2, wherein;
    said rendering processing part sequentially determines the accumulated transparency value $X_n$ when the nth polygon is overlapped.

4. The image processing unit according to claim 1 or 2, wherein:
    said opacity $\alpha_n$ of said translucent polygon is set to $1>\alpha_n>0$, and opacity $\alpha_n$ of said opaque polygon is set to $\alpha_n=1$.

5. The image processing unit according to claim 1 or 2, wherein;
    said rendering processing part omits processing for the nth or later polygon when said accumulated transparency value is zero transparency or smaller than a predetermined minimum value $X_{min}$ in processing for the nth polygon.

6. An image processing method for executing image processing for a plurality of polygons including translucent polygons to generate image data to be displayed, wherein color data $T_n$ and opacity $\alpha_n$ or transparency $(1-\alpha_n)$ are assigned to the nth polygon of the polygons sequentially arranged from the front in a display screen, comprising:
    a step of supplying the color data $T_n$ and opacity $\alpha_n$ or transparency $(1-\alpha_n)$ of said polygon sequentially from said front; and
    a rendering processing step of adding the color data $T_n$ of the nth polygon to an image data $D_{n-1}$, up to the (n−1)th polygon, according to an accumulated transparency value $X_{n-1}$ of the (n−1) polygons positioned at the front.

7. The image processing method according to claim 6, wherein;
    said rendering processing step adds the components for opacity $\alpha_n$ of the nth polygon out of the color data $T_n$ of said polygon to the image data $D_{n-1}$ up to the (n−1)th polygon according to the accumulated transparency value $X_{n-1}$ of the (n−1) number of polygons positioned at the front.

8. The image processing method according to claim 6 or 7, wherein;
    said opacity $\alpha_n$ of each said translucent polygon is set to $1>\alpha_n>0$, and opacity $\alpha_n$ of each said opaque polygon is set to $\alpha_n=1$.

9. The image processing method according to claim 6 or 7, wherein;
    said rendering processing step omits processing for nth or later polygons when said accumulated transparency value is zero transparency or smaller than a predetermined minimum value $X_{min}$ in the processing for the nth polygon.

10. A recording medium which stores a program for a computer to execute an image processing procedure for a plurality of polygons including translucent polygons to generate image data to be displayed, wherein color data $T_n$ and opacity $\alpha_n$ or transparency $(1-\alpha_n)$ are assigned to the nth polygon of the polygons sequentially arranged from the front in a display screen,
    said image processing procedure comprising:
        a step of supplying the color data $T_n$ and opacity $\alpha_n$ or transparency $(1-\alpha_n)$ of said polygon sequentially from said front; and
        rendering processing step of determining an image data $D_n$ by adding the color data $T_n$ of the nth polygon to the image data $D_{n-1}$, up to the (n−1)th polygon, according to an accumulated transparency value $X_{n-1}$ for the (n−1) polygons positioned at the front.

11. An image processing method for executing image processing for a plurality of polygons including translucent polygons to generate image data to be displayed, wherein a color data $T_n$ and opacity $\alpha_n$ or transparency $(1-\alpha_n)$ are assigned to the nth polygon of the polygons sequentially arranged from the front in a display screen comprising:
    a step of supplying the color data $T_n$ and opacity $\alpha_n$ or transparency $(1-\alpha_n)$ of said nth polygon sequentially from said front; and rendering processing step of determining work data $X_n$ by $X_n=(1-\alpha_n) \cdot X_{n-1}$, recording said work data $X_n$ in a work data buffer memory, and determining an image data $D_n$ by $D_n=D_{n-1}+T_n \cdot \alpha_n \cdot X_{n-1}$.

12. An image processing unit for executing a predetermined blending processing for a plurality of polygons to generate image data to be displayed, wherein color data $T_n$ and data on a destination mixing coefficient $DE_n$, and a source mixing coefficient $SR_n$ are assigned to the nth polygon of the plurality of polygons sequentially arranged from the front in a display screen, comprising:

a rendering processing part where the color data $T_n$ of said nth polygon, said destination mixing coefficient $DE_n$ and source mixing coefficient SRn are supplied sequentially from said front, and the color data $T_n$ of the nth polygon is added to an image data $D_{n-1}$, which is provided by rendering processing up to the (n−1)th polygon, according to said destination mixing coefficient $DE_n$ and an accumulated value $X_{n-1}$ of the source mixing coefficients $SR_1$–$SR_{n-1}$ of (n−1) polygons positioned at the front.

13. The image processing unit according to claim 12, wherein;

said rendering processing part sequentially determines an accumulated value $X_n$ of the source mixing coefficient $SR_n$ when the nth polygon is overlapped.

14. The image processing unit according to claim 12 or 13, wherein;

said rendering processing part omits processing for the nth or later polygons when said accumulated value of the source mixing coefficient $SR_n$ is smaller than a predetermined minimum value $X_{min}$ in the processing for the nth polygon.

15. An image processing method for executing a predetermined blending processing for a plurality of polygons to generate image data to be displayed, wherein color data $T_n$ and data on a destination mixing coefficient $DE_n$ and a source mixing coefficient $SR_n$ are assigned to the nth polygon of the plurality of polygons sequentially arranged from the front in a display screen, comprising:

a step of supplying the color data $T_n$ of said nth polygon, said destination mixing coefficient $DE_n$ and the source mixing coefficient $SR_n$ sequentially from said front; and a rendering processing step of adding the color data $T_n$ of the nth polygon to the image data $D_{n-1}$, up to the (n−1)th polygon, according to said destination mixing coefficient $DE_n$ and the accumulated value $X_{n-1}$ of the source mixing coefficients $SR_1$–$SR_{n-1}$ of the (n−1) polygons positioned at the front.

16. A recording medium which stores a program for a computer to execute an image processing procedure, including a predetermined blending processing for a plurality of polygons, so as to generate image data to be displayed, wherein color data $T_n$ and data on a destination mixing coefficient $DE_n$ and a source mixing coefficient $SR_n$ are assigned to the nth polygon of said plurality of polygons sequentially arranged from the front in a display screen, said image processing procedure comprising:

a procedure of supplying the color data $T_n$ of said nth polygon, said destination mixing coefficient $DE_n$ and source mixing coefficient $SR_n$ sequentially from said front; and a rendering processing procedure of adding the color data $T_n$ of the nth polygon to the image data $D_{n-1}$, up to the (n−1)th polygon, according to said destination mixing coefficient $DE_n$ and an accumulated value $X_{n-1}$ of the source mixing coefficients $SR_1$–$SR_{n-1}$ of the (n−1) polygons positioned at the front.

17. An image processing unit which executes image processing for a plurality of polygons including translucent polygons, to generate image data to be displayed, wherein color data $T_n$, and transparency $(1-\alpha_n)$, are assigned to the nth polygon of the polygons sequentially arranged from the front in a display screen, comprising:

a rendering processing part where the color data $T_n$, and transparency $(1-\alpha_n)$, of said nth polygon are supplied sequentially from said front, and the color data $T_n$ of the nth polygon is added to an image data $D_{n-1}$, which is provided by rendering processing up to the (n−1)th polygon, according to an accumulated transparency value $X_{n-1}$ of the (n−1) polygons positioned at the front.

18. An image processing unit which executes image processing for a plurality of polygons including translucent polygons, to generate image data to be displayed, wherein color data $T_n$, and opacity $\alpha_n$ are assigned to the nth polygon of the polygons sequentially arranged from the front in a display screen, comprising:

a rendering processing part where the color data $T_n$, and opacity $\alpha_n$ of said nth polygon are supplied sequentially from said front, and the color data $T_n$ of the nth polygon is added to an image data $D_{n-1}$, which is provided by rendering processing up to the (n−1)th polygon, according to an accumulated opacity value $X_{n-1}$ of the (n−1) polygons positioned at the front.

* * * * *